3,257,213
METHOD OF PREPARING HIGH SHORTENING-CONTAINING PASTRY MIX
Edward E. Colby, Cincinnati, Ohio, assignor to The Procter & Gamble Company, Cincinnati, Ohio, a corporation of Ohio
No Drawing. Filed May 16, 1962, Ser. No. 195,313
1 Claim. (Cl. 99—94)

This invention relates to the preparation of culinary mixes. More particularly, it relates to the production of dry, free-flowing, granular, flour-containing mixes having a high concentration of shortening therein.

The use of free-flowing, flour-containing mixes having a comparatively low concentration of shortening therein for the preparation of baked goods is well known in present day culinary arts. The ordinary prepared cake mixes comprising flour, sugar and shortening are examples of such mixes. These mixes usually contain less than about 20% shortening. For example, a typical yellow cake mix will contain from about 3% to about 13% shortening blended with major amounts of flour and sugar together with minor amounts of the other usual cake ingredients.

Various other flour-containing culinary mixes commonly contain greater than about 20% shortening. The ordinary prepared pie crust mixes comprising flour and shortening are typical examples. When formed by ordinary blending and mixing procedures, these mixes frequently are deficient in handling properties. They tend to be somewhat lumpy and damp in consistency and do not exhibit desirable free-flowing properties. When the level of shortening therein is increased to about 30% or greater, the conventional mixes tend to have the consistency of a thick paste or a mass of sticky dough.

Since it is well known that the richness and other eating qualities of culinary mixes, such as cake and pastry mixes, can be enhanced by increasing the concentration of shortening therein, a convenient method for preparing such dry mixes having a high shortening content and having non-sticky, free-flowing handling properties would find much use in the culinary arts.

Heretofore, it has been proposed to prepare free-flowing, flour-containing mixes having a high concentration of shortening therein by drying an emulsion of fat and oil or other shortening in skim milk or in a solution of casein or other milk protein, or in albuminous material such as egg white and the like which is coagulable by heat. Fundamentally, the said process consists of encapsulating the fat particles in a protective envelope of dry material. While such a procedure is useful for certain products, it may be desirable at times to prepare a mixture of flour and shortening with a high shortening content having none of these encapsulating agents incorporated therein, but still having the convenient handling properties of a dry solid. The presence of these agents involves unnecessary expense in those cases where they are not essential to good baking performance, such as in a pie crust mix. In some cases, the presence of these agents introduces undesirable batter- and dough-forming properties or poor baking qualities into the product. For example, the coating of encapsulating material may prevent the complete or rapid admixture of shortening with other ingredients during batter and dough preparation.

Accordingly, it is a primary object of this invention to provide an improved process for the preparation of a stable, non-sticky, free-flowing, granular, flour-shortening composition independent of the use of the conventional encapsulating agents, whereby the weight ratio of flour to shortening in the granules ranges from about 1:1 to about 4:1.

Briefly stated, the process of this invention comprises the steps of mixing flour and shortening in a weight ratio ranging from about 1:1 to about 4:1 with sufficient water to form a homogeneous slurry and spray drying said slurry to form substantially dry, free-flowing, non-sticky granules, whereby said granules have a matrix composed principally of flour with shortening dispersed throughout said matrix.

As used herein, the term "substantially dry" granules refers to granules which are dry and non-caking in appearance and handling properties and normally can contain up to about 14 weight percent moisture. All moisture percentages mentioned herein are by total weight of the said granules.

The process of this invention produces a flour-shortening composition comprising from about 20 to about 50 weight percent shortening and from about 50 to about 80 weight percent flour. There can be some variation in these percentages in both directions, depending upon the amount of residual moisture in the substantially dry granules, as defined above, and upon the presence of minor amounts of other ingredients which can be present in the slurry, as will be seen subsequently. However, the weight ratio of flour to shortening in the granules will range from about 1:1 to about 4:1, which is the same weight ratio range of said ingredients in the aqueous slurry.

The flour-shortening composition prepared in accordance with this invention can be used immediately, either alone or in admixture with other ingredients, to prepare a culinary mix such as a cake or pastry mix, or it may be temporarily stored in its present condition for further use at a later time. In either event it is desirable to have a product that can be readily mixed with other substances, such as water or various dry ingredients, or can be otherwise handled with relative ease.

Suitable shortenings for the practice of this invention can include any of the conventional plastic, semi-fluid, or liquid glyceride shortenings derived from animal, vegetable, or marine fats and oils. These glycerides can have saturated or unsaturated long-chain fatty acid groups having from about 12 to about 22 carbon atoms such as lauroyl, lauroleoyl, myristoyl, myristoleoyl, palmitoyl, palmitoleoyl, stearoyl, oleoyl, linoleoyl, linolenoyl, arachidoyl, behenoyl, and the like, and are generally obtained from edible fats and oils such as cottonseed oil, soybean oil, coconut oil, rapeseed oil, peanut oil, olive oil, palm oil, palm kernel oil, sunflower seed oil, rice oil, corn oil, sesame seed oil, safflower oil, whale oil, sardine oil, menhaden oil, herring oil, lard, tallow and the like. The glycerides can also contain one or two short-chain saturated fatty acid groups having from about 2 to about 6 carbon atoms such as acetyl, propanoyl, butanoyl, valeryl, and caproyl; they can be prepared by random or low temperature interesterification reactions; and they can be otherwise formed by various organic syntheses.

The shortening can also contain the usual amounts of emulsifiers and other agents such, for example, as mono- and diglyceride emulsifiers, lactylated glyceride emulsifiers, sorbitan or polyoxyethylene sorbitan esters of fatty acids, esters of polyhydric alcohols, fatty acid derivatives of polycarboxylic acids, free fatty acids, and many other substances commonly used in shortening to improve their cooking or other properties.

The flour employed in this invention is of the sort commonly used in present day culinary mixes of the types herein described. For example, with cake mixes it is preferable to use a bleached cake flour, although hard wheat flours or general-purpose flours can also be used. For pastry mixes it is preferable to use an unbleached pastry flour, although other types of flour can be used in some instances, if desired.

Although specific shortening materials and various flours have been mentioned herein, the invention is not limited to these particular substances.

Other minor ingredients such as sodium chloride, sorbic acid, flavoring, colors, and anti-oxidants can be incorporated in the flour-shortening slurry herein described if found expedient, but are unnecessary in the practice of the instant invention. These ingredients can also be added to the mix in the usual amounts after the completion of the spray drying, if desired.

The initial step in practicing the process of this invention is the preparation of an aqueous and homogeneous slurry of the flour and shortening. The amount of water used in this slurry can be varied considerably, but it is generally desirable that at least sufficient water be present to avoid development of gluten in the flour and the formation of a stringy elastic mass instead of a homogeneous slurry. The preferred water content in the slurry is about ½ to about 5 times the weight of the flour.

The ingredients of the slurry can be mixed in any sequence as long as a completely mixed or otherwise substantially uniform slurry is formed. A preferred method of forming the slurry consists of first mixing the flour and water and then adding the shortening.

For convenience of handling, it is generally desirable to use a shortening that is liquid at room temperature, although the type of shortening material used is not critical to the invention. If a plastic-type shortening is used, it is preferable to melt it prior to its incorporation in order to facilitate the formation of the slurry. However, the temperature of the slurry is preferably maintained below the gelatinization point of the starch in the flour (usually below 150° F.). Slurry temperatures of about 100° to about 150° F. have been found to be suitable for this purpose.

The slurry is then dried, preferably by a spray-drying method whereby the slurry is atomized and the suspended particles are contacted with hot air or other gases. By means of this spray drying, the greater part of the moisture is evaporated from the slurry, and substantially dry, free-flowing granules of the remaining solid materials are formed.

The spray drying process should be controlled so that sufficient moisture is evaporated from the atomized slurry to form substantially dry granules without subjecting heat-sensitive material therein to temperature conditions which cause undesirable deterioration of product, such as gelatinization of starch and the like. Since, by the very nature of the spray drying process, it is difficult to measure the temperature of the suspended particles in the spray dryer, it is more convenient to control the process by means of the inlet- and outlet-gas temperatures. Of course, these temperatures can be varied and will depend somewhat upon such variables as the concentration of water in the slurry; the feed rate and temperature of the slurry; the humidity, velocity, and direction of flow of the circulating hot gases; the preferred moisture content of the spray-dried granules; and the throughput of the spray dryer equipment. Typical examples of the various spray drying conditions which can be used in the practice of this invention are illustrated in the specific examples included herein, although the invention is not limited thereby. In conducting the said spray drying process, it has been found preferable to use an inlet-gas temperature of from about 300° to about 500° F. This temperature range preferably is used in combination with other spray drying conditions which provide for evaporation of moisture from the slurry particles in a manner whereby the surrounding gases are cooled to an outlet-gas temperature of less than about 180° F. During this process, the moisture content of the spray-dried granules is preferably reduced to a level of from about 4 to about 10 weight percent. The flow of the said spray-drying gases can be either concurrent or countercurrent to the slurry flow.

The spray-dried particles should be removed from the spray drying chamber and cooled as quickly as possible in order to avoid any unnecessary deterioration of product caused by excessive exposure to high temperatures. The resultant particles are free-flowing granules having a substantially uniform composition of flour and shortening. They are preferably in the form of hollow spherical particles in which the shortening is finely dispersed throughout a flour matrix. The superior dispersion obtained by the present process produces stable granules which are highly resistant to the separation of oil at ordinary room temperatures and upward to about 120° F. The finished granules can be used directly in a culinary mix or can be mixed with other ingredients can blended by various means such as agglomeration and the like, if desired.

The following examples illustrate the process and product of this invention, but the invention is not limited to these specific examples.

Example 1

Four parts by weight of bleached soft-wheat cake flour and 1 part by weight of refined, bleached cottonseed oil were mixed with 8.33 parts by weight of water to form a slurry. The mixing was carried out in a baffled tank with a turbine agitator. After it was thoroughly mixed at a temperature of about 125° F., the slurry was spray dried in a conventional spray tower having an overall height of 15 feet, including an upper cylindrical section which was 6 feet high and 6 feet in diameter and a lower conical section which was 9 feet high and tapered to a point at its lower extremity. The slurry flow was maintained at a rate of about 2.4 lbs./minute, under a pressure of 5,500 p.s.i., and sprayed through an atomizing nozzle having a diameter of 0.0225 inch. A downward air flow, concurrent with the flow of the atomized slurry, was maintained at a rate of about 950 c.f.m. The spray dryer had an inlet-air temperature of about 400° F. and an outlet-air temperature of about 150° F.

The final granular product had a moisture content of about 7.9%, a weight ratio of flour to shortening of about 4:1, and was dry and free-flowing in appearance and handling properties. It was eminently suitable for use as a component in a prepared dry culinary mix from which excellent quality cakes could be made.

A mixture of the same quantity of flour and oil, without added water, prepared by mixing in the conventional manner with a Hobart mixer, model C–10, at speed number 1, had a damp and lumpy consistency and was inferior in handling properties to the product prepared in the above example.

Example 2

A slurry was prepared by mechanically agitating 2.33 parts by weight of soft-wheat cake flour and 1 part by weight of a shortening consisting of 95% directed rearranged lard (produced by the method described in U.S. Patent No. 2,875,066, granted to Holman & Going) hardened to a solids content index of 20 at 70° F., 4% soybean oil hardened to a solids content index of 3 at 70° F., and 1% cottonseed triglyceride hardened to an Iodine Value of about 8, with 5.56 parts by weight of water having a temperature of 123° F. The slurry was spray dried according to the method described in Example 1, above, to produce a dry, free-flowing, granular product having a moisture content of 6.6%, and a weight ratio of flour to shortening of about 2.33 to 1. The granular product was suitable for use in a dry cake mix formulation, from which acceptable cakes could be baked.

Example 3

1.5 parts by weight of unbleached pastry flour and 1 part by weight of refined bleached cottonseed oil were mechanically agitated with 4.17 parts by weight of water having a temperature of about 129° F. A slurry was prepared from the mixture and spray dried as in Example 1, above, to produce a stable, dry, free-flowing granular product having a moisture content of 5.2%, and a weight ratio of flour to shortening of about 1.5 to 1. The granular mix was suitable as a base material for the preparation of tender pastry doughs and meat pie crusts. Various other conventional dough-forming ingredients can be incorporated in the slurry, or in the final mix, if desired, to give a finished pastry mix having enhanced culinary qualities.

When similar flour and fat ingredients were mixed in the same proportions, without water, in the conventional manner with a Hobart paddle mixer, model C–10, at speed number 1, a sticky, viscous mass of dough having the consistency of a thick paste was formed.

*Example 4*

A homogeneous slurry was prepared from 1 part by weight of unbleached soft-wheat pastry flour, 1 part by weight of the shortening described in Example 2, and 3.33 parts by weight of water. The slurry was spray dried as in Example 1 to produce a dry, free-flowing, granular product having a moisture content of less than about 10%, and a weight ratio of flour to shortening of about 1:1. The shortening was thoroughly dispersed throughout a matrix of flour in the granules and was highly resistant to separation from the said flour. The granular product was suitable as a prepared pie crust mix. If it is desired, minor amounts of sodium chloride and other dough-forming ingredients can be added to this mix. The mix can then be used as a base material to prepare delicious crusts for tarts, pies, parfait desserts, and apple turnovers. The said minor ingredients can be incorporated into the mix by adding them to the water slurry, if preferred, so long as they are not harmed by the subsequent spray-drying.

An identical flour-shortening composition, without added water, prepared in the conventional manner and mixed in a Hobart mixer in the manner described in the previous examples, had a sticky and pasty consistency and was not free-flowing.

*Example 5*

1.68 parts by weight of pastry flour were mixed with 3.54 parts by weight of water, 0.027 part by weight of sodium chloride and 1 part by weight of the shortening described in Example 2. The said materials were mechanically agitated and mixed together for 10 minutes in a baffled tank at 100° F. The resulting slurry, under a pressure of 3,000 p.s.i., was pumped into the spray drying tower, described in Example 1, at a rate of about 1.9 lb./minute, and sprayed through an atomizing nozzle having a diameter of 0.020 inch. The inlet-air was maintained at about 450° F. and the outlet-air had a temperature of about 170° F.

The resulting product consisted of dry, free-flowing, non-lumpy granules comprising shortening occluded in a matrix composed principally of flour. The moisture content of the granular product was less than about 10% by weight, and the flour and shortening constituents were in a weight ratio to each other of about 1.68 to 1. 341 grams of the spray-dried granules were mixed with 62 grams of water, rolled into a sheet of pie dough and baked for 14 minutes at 425° F. A very tender pastry shell was produced.

Although particular methods of baking the products of this invention are described herein, the invention is not limited thereby, and any conventional method of baking flour-shortening products can be used.

What is claimed is:

The method of making a non-sticky, free-flowing, granular pastry mix which comprises the steps of forming by mechanical agitation a mixture consisting of flour and shortening in a weight ratio ranging from about 1:1 to about 4:1 and water in an amount ranging from about ½ to about 5 times the weight of the flour and sufficient to form a homogeneous slurry without the development of gluten at a temperature above the melting point of the shortening but below the gelatinization point of the flour, and thereafter atomizing said slurry through a high pressure nozzle directly into a spray drying chamber of circulating hot gases having an inlet-gas temperature ranging from about 300° F. to about 500° F. and an outlet-gas temperature less than about 180° F. to form discrete, substantially dry granules having a moisture content ranging from about 4 to about 10 weight percent and a matrix consisting of flour with shortening dispersed throughout said matrix.

References Cited by the Examiner

UNITED STATES PATENTS

| | | | |
|---|---|---|---|
| 1,431,938 | 10/1922 | Dunham | 99—94 |
| 1,432,057 | 10/1922 | Dunham | 99—94 |
| 1,959,466 | 5/1934 | Duff | 99—94 |
| 2,567,815 | 9/1951 | Kipnis | 99—94 |
| 2,680,303 | 6/1954 | Gustavson | 99—94 X |
| 2,808,334 | 10/1957 | Battiste | 99—94 |

FOREIGN PATENTS

| | | |
|---|---|---|
| 20,715 | 6/1929 | Australia. |
| 622,017 | 6/1961 | Canada. |

A. LOUIS MONACELL, *Primary Examiner.*

ABRAHAM H. WINKELSTEIN, *Examiner.*

J. M. GOLIAN, M. W. GREENSTEIN,
*Assistant Examiners.*